Feb. 26, 1924.  
C. A. A. HAIGHTON  
1,485,076
MEANS FOR FLATTENING THE CURRENT WAVES OF PULSATING DIRECT CURRENT
Filed Dec. 20, 1922
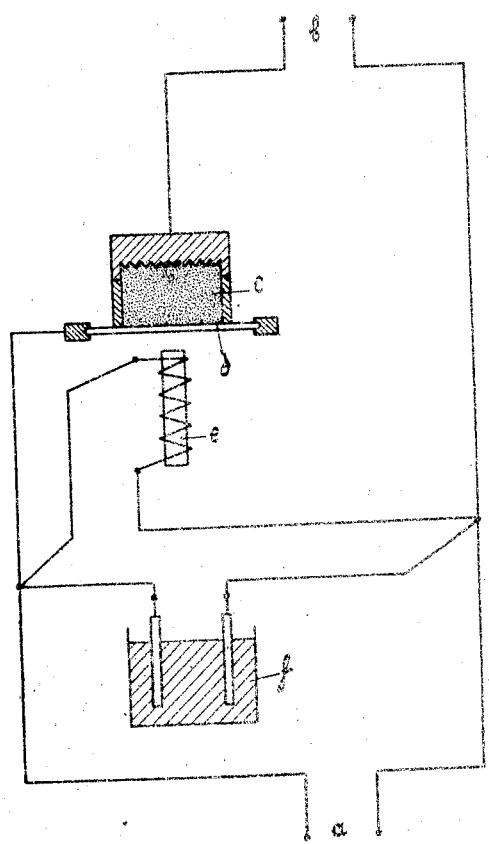
Inventor:
C.A.A Haighton
by Marker Clerk
Attys Patented Feb. 26, 1924.

1,485,076

UNITED STATES PATENT OFFICE.

COENRAAD A. A. HAIGHTON, OF THE HAGUE, NETHERLANDS.

MEANS FOR FLATTENING THE CURRENT WAVES OF PULSATING DIRECT CURRENT.

Application filed December 20, 1922. Serial No. 608,078.

*To all whom it may concern:*

Be it known that I, COENRAAD ALFRED AUGUSTUS HAIGHTON, a subject of the Queen of the Netherlands, residing at The Hague, Province of South Holland, Kingdom of the Netherlands, have invented certain new and useful Improvements in or Relating to Means for Flattening the Current Waves of Pulsating Direct Current, of which the following is a specification.

The invention relates to means for flattening the current waves of pulsating direct current and more particularly of direct current as is produced by rectifiers, the object of my present invention being to obtain a direct current which is adapted for use in such cases, in which a more constant direct current is required for guaranteeing a satisfactory working, as e. g. for telephone purposes.

According to the invention a so called loose contact is placed in the circuit, the resistance of said contact being controlled by an electromagnet, which is energized with the frequency of the pulsations of the current, the excitation of the magnet taking place in such a way, that the resistances of the loose contact increase with the current and vice-versa, so that the current in the apparatus where it is consumed attains a more constant flow. In order to raise the current to a certain height during that part of the period in which it nears its zero value, according to the invention one or more gas batteries are further connected parallel with the source of the pulsating direct current for which e. g. a battery may be chosen, comprising lead plates emerged into a solution of alum. When in this case the current of the rectifier exceeds a certain value, the battery accumulates energy, which when the current sinks below a certain value is again delivered.

In order that the invention may be readily understood it is hereinafter more fully described with reference to the accompanying drawing in which the diagram of the arrangement according to the present invention is illustrated. To the binding posts $a$ $a$ rectifier is connected, whereas the consumer apparatus or plans are connected to the binding posts $b$, loose contact $c$ being inserted into the conductor connecting the binding posts $a$ and $b$, such contact in the diagram being shown as a microphone having carbon grains and an iron diaphragm $d$. The latter is actuated upon by an electro-magnet $e$ the windings of which are connected parallel with the rectifier. This electro-magnet $e$ is energized with the frequency of the pulsations of the current and therefore may be inserted into the alternating current circuit of the rectifier. When during one period of the current the voltage of the binding posts $a$ rises, the diaphragm $d$ will be more attracted by the electro-magnet $e$, and the resistance of the loose contact $c$ will be increased thereby, the main current passing through the consumer apparatus decreasing as a result therefrom. A portion of the current will pass through the gas battery $f$ by which the polarization of this battery is effected. When during one period of the current the voltage again decreases, the diaphragm $d$ is more feebly attracted so that the main current again rises, whereas in the case of a certain decrease of said voltage the gas battery $f$ will again deliver the current. By this arrangement it is obtained, that the current waves of the pulsating direct current of the rectifier are more flattened, so that such direct current may be used for purposes for which it could otherwise not be applied.

It will be clear that in the circuit still other resistances for a further control as also choking coils may be inserted, without the scope of the invention being departed from.

What I claim is:

1. In a pulsating direct current system, means for flattening the current waves of the pulsating direct current comprising a variable resistance loose contact interposed in said circuit, an electro-magnetic means interposed in and energized with the frequency of the pulsations of current in said circuit, said loose contact being controlled by said electro-magnetic means whereby, when the excitation of the electro-magnetic means is increased the resistance of the loose contact is increased, and, when the excitation of the electro-magnetic means is decreased, the resistance of the loose contact is decreased.

2. A system for flattening the current waves of pulsating direct current wherein a gas battery is connected up in parallel with the source of the pulsating direct current, characterized by the provision in the direct current circuit of a variable resistance loose contact, electro-magnetic means interposed in and energized with the frequency of the pulsations of current in said circuit, said loose contact being controlled by said electro-magnetic means whereby, when the excitation of the electro-magnetic means is increased, the resistance of the loose contact is increased, and when the excitation of the electro-magnetic means is decreased, the resistance of the loose contact is decreased.

In testimony whereof I affix my signature.

C. ALF. A. HAIGHTON.